United States Patent [19]
Jaccard

[11] Patent Number: 5,383,814
[45] Date of Patent: Jan. 24, 1995

[54] HAND TENDERIZER

[76] Inventor: Andre R. Jaccard, 3421 N. Benzing Rd., Orchard Park, N.Y. 14127

[21] Appl. No.: 116,116

[22] Filed: Sep. 2, 1993

[51] Int. Cl.⁶ .................................................. A22C 9/00
[52] U.S. Cl. ................................................... 452/141
[58] Field of Search ............................... 452/141, 148

[56] References Cited

U.S. PATENT DOCUMENTS

| | | | |
|---|---|---|---|
| 2,322,243 | 6/1943 | Larson et al. | 452/141 |
| 2,520,032 | 8/1950 | Estes | 452/141 |
| 3,583,025 | 6/1971 | Jaccard | 452/141 |
| 3,611,476 | 10/1971 | Clifton | 452/141 |
| 3,869,755 | 3/1975 | Stauft | 452/141 |
| 3,900,918 | 8/1975 | Allinquant et al. | 452/141 |
| 4,112,544 | 9/1978 | d'Arras | 452/141 |
| 4,205,414 | 6/1980 | Ueno et al. | 452/141 |

Primary Examiner—Willis Little
Attorney, Agent, or Firm—James J. Ralabate

[57] ABSTRACT

This invention involves a powered handheld meat tenderizer. The tenderizer has features that provide easy access to the blades for cleaning, oiling and blade replacement. Since a motor provides the energy to move the blades in an up and down motion, little, if any, manual pressure is required during the tenderizing process. The blades are movably attached to the power source and are easily activated by a trigger or other activating means similar to those used on an electric drill.

8 Claims, 3 Drawing Sheets

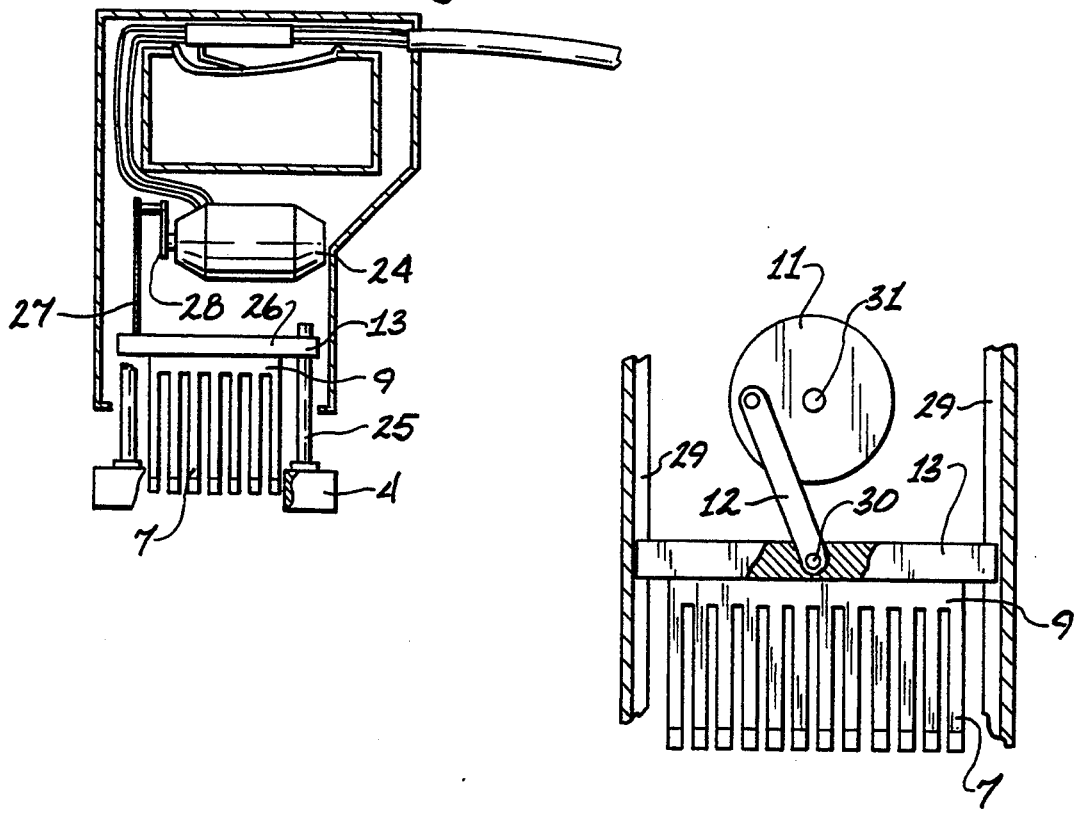
Fig. 5
Fig. 6
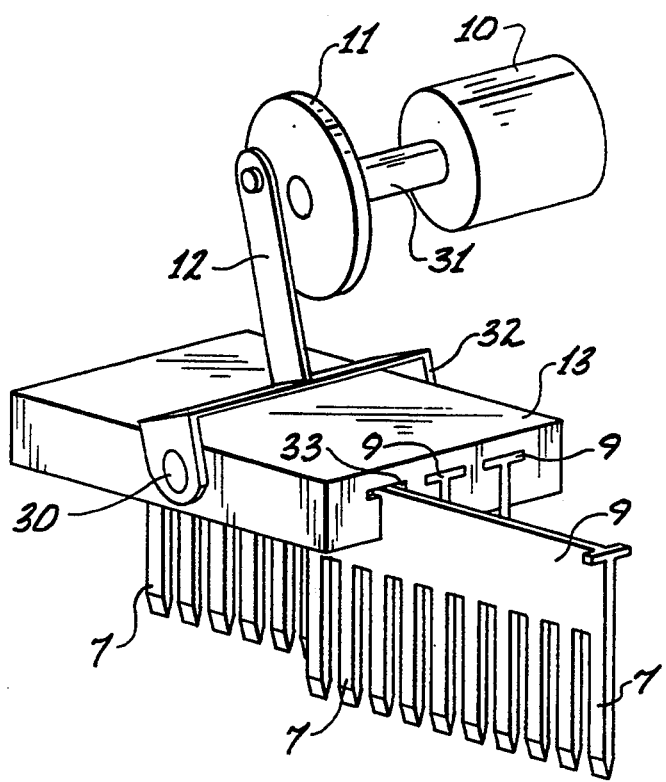
Fig. 7

HAND TENDERIZER

This invention relates to a meat tenderizer and, more specifically, to a motorized handheld meat tenderizer.

BACKGROUND OF THE INVENTION

There are several known methods for tenderizing meats, some chemical and some mechanical. The chemical meat tenderizing processes are falling out of favor because of the required use of chemicals and because of the present availability of mechanical tenderizers. Mechanical meat tenderizers have been known for many years such as those described in U.S. Pat. Nos. 207,107 (Davis) which issued in 1878: 1,047,346 (Walker) which issued in 1912 and 1,903,789 (Michaels) which issued in 1933. More recent popular meat tenderizers invented by the present inventor are disclosed in U.S. Pat. Nos. 4,199,841 (Jaccard I) issued Apr. 29, 1980 and 4,463,476 (Jaccard II) issued Aug. 7, 1984. All of these patents disclose handheld mechanical means for tenderizing meats but none of them suggest the use of motorized handheld means for this process.

In Jaccard I a hand meat tenderizer is disclosed which allows a plurality of incisions to be made simultaneously in a meat cut and which comprises a plurality of blades attached to a handle. The handle means in the 4,199,841 Jaccard I patent comprises a pair of separable complementary members secured together by a bolt extending through one of said handle members through said blade assembly and threadly engaged in the other handle members. Users of Jaccard I push down on the handle means and compression springs 59 permitting the blades to move up and down.

In Jaccard II the same type of manual handheld tenderizer is disclosed having a liquid flow channel therein to accommodate the flow of fluids therethrough for improved cleaning. In both Jaccard I and II springs and spring housings are needed as are blade-handle attachment which somewhat complicates disassembly of the devices. Also, after cleaning or blade replacement, reassembly of pieces including handle parts, springs, spring housings, spacers, blades and other components, could become tedious and complicated. The tenderizers disclosed in Jaccard I and Jaccard II have perhaps become the most successfully used handheld meat tenderizer by both households and commercial establishments. Cleaning and replacement of the blades in these tenderizers can be complicated and somewhat difficult. The blade segments of Jaccard I and II are removed for sharpening or replacement by loosening and removing screw 25 (in 4,199,841). This process separates handle members 19 and 21 and opens the tenderizer so that blade segments 15 can be removed together with spacer blocks 31 and 32. After the blade segment or segments are sharpened or removed and replaced, spacer blocks 31 and 32 must be arranged and interfitted with blade segments 15 so that bolt or screw 25 apertures are all aligned. Since the bolt 25 traverses through all blade segments in Jaccard I and II, removal of bolt 25 disturbs and displaces all other elements such as other blade segments 15, all spacer blocks 31 and handle members 19 and 21. Thus, to change a blade, central screw 25 is removed; each have to be realigned with all blade segments 15 and spacer blocks 31 and handle parts 19 and 21 when being reassembled. These same disassemble-assemble complex maneuvers are necessary in most prior art tenderizers.

In U.S. Pat. No. 1,047,346 (Walker) for example, bolts 14 are passed through each blade or knife segment for holding or clamping these sections together. The knives are secured by a bolt 14 and are removed by removing bolt 14. By further removing pins 18 of Walker any and all of the knives (blades) can be replaced should any become worn or broken; see Walker column 2 lines 85-100. To reassemble, all of the blades need to be removed even if only one is to be replaced, and all aligned with apertures adjacent each other for the securing together by bolt 14.

U.S. Pat. No. 1,903,789 (Michaels) also discloses a meat tenderizer having blades 12 with apertures 15 for receiving a bolt; the bolt being employed to rigidly secure the blades 12 together. The bolt is tightened by wing nut 17 to hold all of the blades and tongues together. Again to remove one blade all of the blades need to be displaced; the same with reasssembly; see Michaels page 2 lines 32-050.

There are also motorized tenderizers known and used in the prior art. Large conveyor commercial type tenderizers such as disclosed in U.S. Pat. No. 4,216,566 are known. These type tenderizers are usually large complex pieces of commercial equipment requiring a large base or foundation to support the actual tenderizing mechanism. Smaller handheld tenderizers of the type disclosed in U.S. Pat. Nos. 3,892,988 (Gran) and 4,908,909 (Akrenius) are also known. Neither of these patents disclose a handheld tenderizer with blades that provides safety or protective means over the exposed knives or rollers. In Gran, serrated roller 11 and serrated surface 53 are exposed without any protective devices provided to prevent injury by the exposed surface 53. In Akrenius, the hammer head 8 is also exposed which could cause a safety hazzard when in use or in motion. Neither Gran nor Akrenius suggests a simple blade construction to facilitate changing of one of the blades without disturbing the remaining blades.

SUMMARY OF THE INVENTION

It is therefore an object of this invention to provide an automatic handheld tenderizer devoid of the above-noted disadvantages.

Another object of this invention is to provide a motorized handheld tenderizer that is simple in construction and relatively easy to manufacture.

Still another object of this invention is to provide a handheld tenderizer that is easy to clean, replace blades, reassemble and lubricate.

A further object of this invention is to provide a handheld tenderizer that is easy and effective to use.

Another further object of this invention is to provide a tenderizer mechanism that uses a plurality of readily available components.

Still another object of this invention is to provide a tenderizer that is powered by a conventional small motor that may easily be repaired or replaced.

These and other objects of this invention are accomplished in accordance with this invention by a handheld meat tenderizer having a powered motion means (power means) that imparts an up and down motion to the tenderizer blades. By "blades" is meant to include needles, knives, blades or other sharp means to tenderize the meat. A small motor is provided in the interior of the tenderizer housing which includes an armature in which the electromotive force or other force is induced such as air driven blades. An arm or rod (connecting means) is movably attached to the rotary extending out from the motor on one end and attached to a blade fork on the other end. The circular movement of the rotary will impart to the arm (connecting means) an up and down motion which correspondingly is directed to the blades. The motor used can be powered by batteries, electricity or other means or fuels. Any conventional motor may be used such as those used in electrical drills, air driven devices, guns or the like. Telescoping pistons or other spring-loaded tubes are used as means to accommodate this blade up-down movement and to direct the blades through an aligned guide aperture. These tubes are attached to the guide plate referred to above. The lower terminal end of the movable arm is attached to the blade holder. The fork therefore is made up of two tubes and arm connecting means and the blade holder. The tubes prevent lateral movement of the blades in addition to providing guidance for up and down telescopic movement of the fork assembly. The blade guide (guide plate) used to maintain a straight blade path is located at the lower terminal end of the two tubes and connects the guide plate to the main frame of the tenderizer. In addition, an important feature of the guide blade is as a protective or safety means which substantially completely covers the sharp sections of the blades when the tenderizer is inactive or not in use. In the guide plate there are positioned one or more horizontally (or vertically) disposed slits or apertures through which the blades pass on their way to contacting the meat surface to be tenderized. The blades are in vertical alignment with the slits and are prevented from bending by their proximity to the sides of each slit. In one blade configuration, i.e. with one blade segment, only one slit is required in the blade guide. In embodiments having more than one blade segment, the number of slits will be equal to the number of blade segments used. The blade holder provides means for holding one or multiple baldes together and can take any suitable configuration that will permit blades to be individually removed without disturbing or displacing the other blades. This provides easy access to the blades when removal and replacement of one blade segment is required or to oil the blades for improved performance.

BRIEF DESCRIPTION OF THE DRAWING

FIG. 5 is a plan side view of the inner section of a tenderizer embodiment of FIG. 4 of this invention.

FIG. 6 is a side plan view of the motor arm connection to the blades of any embodiment of this invention.

FIG. 7 is a perspective view of the blade holder with individual removable blade means.

DESCRIPTION OF THE DRAWINGS AND PREFERRED EMBODIMENTS

Figure 1:
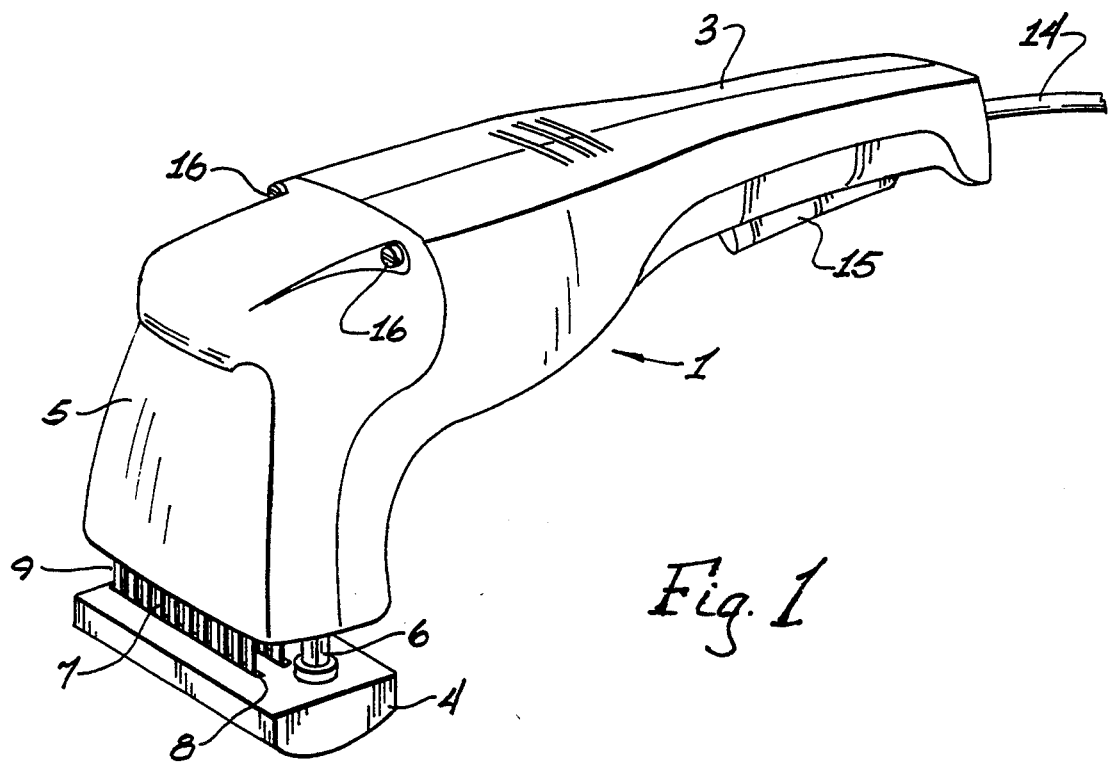
FIG. 1 is a perspective side view of a tenderizer embodiment of this invention.
Figure 2:
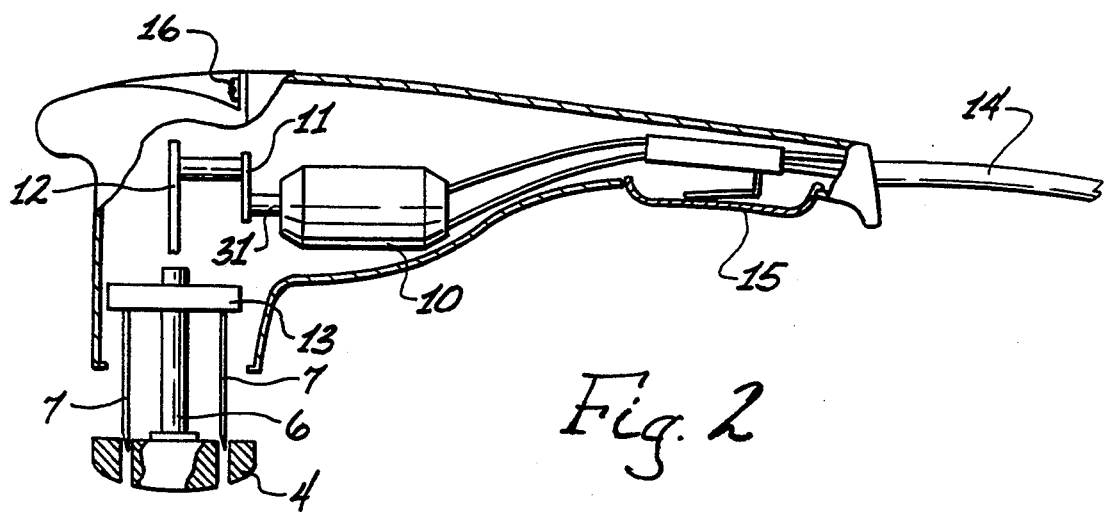
FIG. 2 is a plan side view of the inner section of a tenderizer embodiment of FIG. 1 of this invention.
Figure 3:
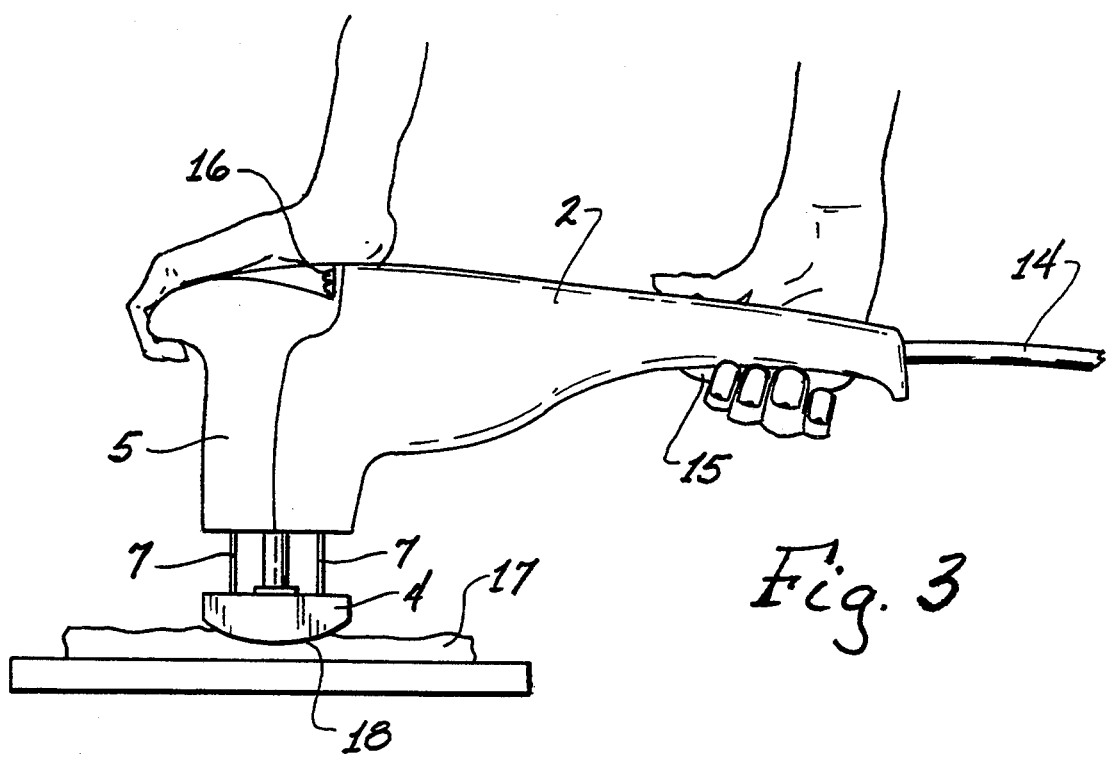
FIG. 3 is a perspective side view of a tenderizer embodiment of this invention while in use.

A tenderizer 1 is made up of a handle housing 2 having a handle portion 3 and a blade housing portion 5. A guide blade 4 is located below the blade housing 5 and is connected thereto by tubular structures 6. The guide 4 maintains blades 7 in alignment and guides the blades 7 during their downward path into the meat to be tenderized. A critical purpose of the guide 4 is that of a safety means to prevent exposure of the sharp end portions of blades 7 when said tenderizer is stored or in the inactive mode. The guide 4 has an equal number of slits or apertures 8 to the number of blade segments 9 used. The embodiment of FIG. 1 shows the use of three blade segments 9 and three guide slits 8, however, any number of slits 8 may be used. The blades 9 are movable relative to guide 4 up and down or toward and away from the meat by the power means or motor 10 as shown in FIG. 2. It is important to the invention that the power means be located within the tenderizer housing. As motor rotary 11 rotates, it moves arm 12 via spindle 31 in a circular motion causing up and down motion to blades 7, blade holder 13, tubes 6 and guide 4. An electric cord 14 connects motor 10 to a power source, however, batteries may be used in place of electrical outlets such as cords or wires 14. Also, if suitable, other power sources such as fuels, solar energy and the like may be used to power the motor 10. An appropriate activation means such as trigger 15 connected to motor activation means may be used in a conventional way similar to that of an electric drill. To remove or clean or replace the blades, the user merely needs to loosen screws 16 to disengage blade housing 5 from handle housing 2 to gain access to the blade segments 9. Blade segments 9 including holder 13 are then lifted out of housing 5 or housing 20 of FIGS. 4 and 5. Tubes 6 may be telescoping tubes or singular tubes with resilient means such as springs therein. The motor 10 may be a conventional motor as used in electric razors, drills and the like. In FIG. 3 the tenderizer 1 in use is illustrated as it contacts the meat 17 to be tenderized. It is preferred for best results that the bottom surface 18 of guide 4 be rounded for a rocking action when tenderizing, however, a flat bottom could be used if appropriate. Two hands may be used to steady tenderizer 1 or one hand could be used at the trigger 15 section. The blades 7 are projected downwardly into meat 17 cutting or severing the tendons or connective tissue in the meat to tenderize it improving the texture of the meat, reducing cooking time and providing a tenderizing effect while maintaining the natural juices in the meat.

The present invention further provides for easier cleaning of the blades than possible in prior art devices. The front blade housing 5 is easily removed to gain access to the blades to clean the blades and/or to provide easy means for lubricating and coating the interior metal portions. Proper lubrication of the interior with salad or cooking oils greatly enhances the operability of the tenderizer. The arrangement of the blades 7 and segments 9 need not be disturbed when housing 5 is removed. This is a significant improvement over the arrangement of tenderizers disclosed in U.S. Pat. Nos. 4,199,841 and 4,463,476 where the blade segments are automatically disengaged when the unit is disassembled for cleaning. This feature is critical to the present invention and is a departure from the structures of prior art tenderizers; see, for example, FIG. 4 of U.S. Pat. No. 4,199,841 wherein removal of screw 25 automatically disengages blade segments 15 which then require alignment attachment and fitting when reassembled. The loosening of separation means or screws 16 in the present structure does not disturb the blade segments 9 arrangement and thus does not require a complex blade realignment and fitting after oiling, etc. Note in FIG. 2 of the present invention screws 16 merely disengage the housing 5 from housing 2 and does not disturb the blade 7 or segment 9 arangement. Again, this feature is extremely important to the present invention and provides a significant improvement over the prior art.

Figure 4:
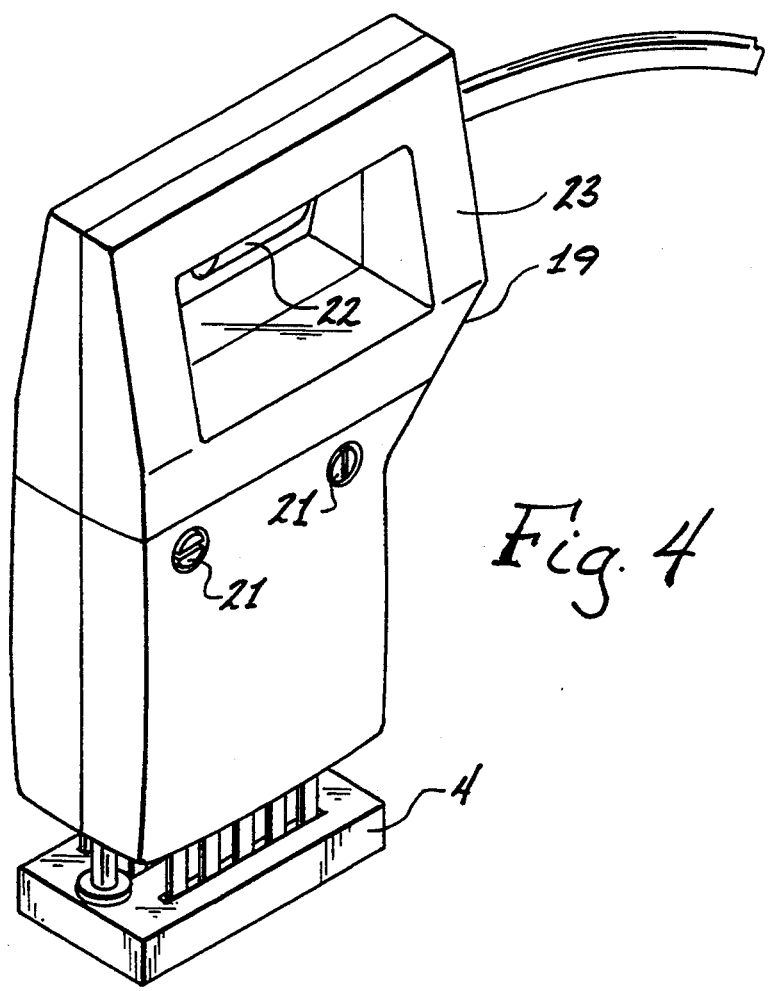
FIG. 4 is a perspective side view of another tenderizer embodiment of this invention.

In FIGS. 4 and 5 a second embodiment of the present invention is illustrated. In these figures the handle housing 19 is located above the blade housing 20 and attached thereto by screws 21. The trigger 22 can be located inside of handle section 23 and is easily accessible there. Again, blade oiling or blade changing is greatly simplified since screws 21 do not interfere with or touch the blades when removed. Thus, reassembly is not necessary in the majority of cases when blade housing 20 is disengaged from handle housing 19. In this embodiment, motor 24 is located above blade segments 25 and blade holder 26. Arm 27 and motor rotary 28 (elements 12 and 10, respectively, in other figures) are also above blade segments 25 (same as segments 9 in other figures). Arm 27 may be attached to the side of holder 13 as in FIG. 5 or in the center of holder 13 as in FIG. 2 or a fork-like arrangement as in FIG. 7.

In FIG. 6 the rotary 11 arrangement with blade holders 13, blade tracks 29 and arm 12 is shown. As motor rotary 11 rotates, arm 12 follows its path and directs blade segments 9 up and down through guide 4 to the meat to be tenderized as shown in FIG. 3. Blade tracks 29 are located on both sides of segments 9 and provide a secure path and travel track for segments 9 to follow in their upward and downward motion and to be used in removing blade holder 13 from the unit. As noted earlier, one or more blade segments 9 may be used. Arm 12 can be disengaged from holder 13 at connection 30 when blade holder 13 and segments 9 need to be removed or changed. Again, note that all other blade segments remain in their original position undisturbed and not requiring reassembly when only one segment 9 is removed as shown in FIG. 7. The rotary arrangement shown in FIG. 6 is different from FIG. 7 in that only one arm 12 is used in FIG. 6 whereas two legs 32 are used in FIG. 7. The same arrangement can be used for all embodiments of this invention, however, any other suitable arrangement can be used.

In FIG. 7 a preferred embodiment for the blade holder 13 is illustrated; however, any suitable blade holder that will permit individual blade segments 9 to be removed without disturbing or removing the other segments can be used. In this embodiment T-shaped grooves 33 are provided in at least one end portion of blade holder 13. To remove a blade segment 9, the user merely slides a segment 9 from the groove 33 of holder 13 and the blade is removed and easily replaced. The blade holder 13 is movably connected to arms 12 to provide the up and down motion imparted by the rotation of rotary 11. Rotary 11 of course is connected and powered by motor 10 as shown in earlier figures.

In the embodiment shown in FIG. 7 motor 10 would have two legs 32, one on each end of the holder 13. There are two legs 32 as shown, each connected to arm 12. Any type suitable connection can be used; in the drawing one rotary 11 and one arm 12 are connected to a two prong fork-like connection with arms 32 extending to each side of connector 13 to power the blades to their up and down motion. Any other suitable arrangement may be used, if desired. The critical aspect of this arrangement is that a structure be used which will permit individual blade segments 9 to be slid out of tracks 29 and removed without removing any of the other segments 9.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. A blade segment for use in a handheld meat tenderizer comprising an integral unit having a substantially rectangular configuration when viewed from a front perspective and having a substantially T-shaped configuration when viewed from a side perspective, said blade segment having an upper substantially solid section having a plurality of elongated sharpened blades suspended therefrom, each of said sharpened blades terminating in a beveled, pointed and sharpened manner for easier entrance in a meat portion to be tenderized.

2. The blade segment of claim 1 wherein a top horizontal portion of said T-shaped configuration extends for at least a portion of a length of said rectangular configuration.

3. A blade assembly for use in a handheld meat tenderizer, said blade assembly comprising at least one blade segment each of said segments having a substantially rectangular configuration when viewed from a front perspective and having a substantially T-shaped configuration when viewed from a side perspective, said blade segment having an upper substantially solid section having a plurality of elongated sharpened blades suspended therefrom, each of said sharpened blades terminating in a beveled, pointed and sharpened manner for easier entrance in a meat portion to be tenderized.

4. A handheld meat tenderizer comprising in combination a housing means, a blade assembly, and power means to move said blade assembly, said blade assembly comprising at least one blade segment each of said segments having a substantially rectangular configuration when viewed from a front perspective and having a substantially T-shaped configuration when viewed from a side perspective, said blade segment having an upper substantially solid section having a plurality of elongated sharpened blades suspended therefrom, each of said sharpened blades terminating in a beveled, pointed and sharpened manner for easier entrance in a meat portion to be tenderized.

5. The tenderizer of claim 4 wherein said blade assembly comprises one blade segment.

6. The tenderizer of claim 4 wherein said blade assembly comprises more than one blade segment.

7. A handheld meat tenderizer comprising in combination a housing means, a blade assembly, and power means to move said blade assembly, said blade assembly comprising at least one blade segment, said blade segment comprising an integral unit having a substantially rectangular configuration when viewed from a front perspective and having a substantially T-shaped configuration when viewed from a side perspective, said blade segment having an upper substantially solid section having a plurality of elongated sharpened blades suspended therefrom, each of said sharpened blades terminating in a beveled, pointed and sharpened manner for easier entrance in a meat portion to be tenderized.

8. The tenderizer of claim 7 wherein said power means has means to impart an up and down motion to said blade assembly.

* * * * *